(12) United States Patent
Brewer

(10) Patent No.: US 9,964,178 B1
(45) Date of Patent: May 8, 2018

(54) WIRE ROPE LOGGING CHOKER

(71) Applicant: Randy Brewer, Mt. Hope, WV (US)

(72) Inventor: Randy Brewer, Mt. Hope, WV (US)

( * ) Notice: Subject to any disclaimer, the term of this patent is extended or adjusted under 35 U.S.C. 154(b) by 0 days. days.

(21) Appl. No.: 15/330,468

(22) Filed: Sep. 23, 2016

Related U.S. Application Data

(60) Provisional application No. 62/285,132, filed on Oct. 19, 2015.

(51) Int. Cl.
  *F16G 11/14* (2006.01)
  *B23K 31/02* (2006.01)
  *B23K 101/32* (2006.01)

(52) U.S. Cl.
  CPC .............. *F16G 11/14* (2013.01); *B23K 31/02* (2013.01); *B23K 2201/32* (2013.01)

(58) Field of Classification Search
  CPC .......... F16G 11/02; F16G 11/04; F16G 11/00; F16G 11/14; Y10T 403/7039; B23K 31/02; B23K 2201/32
  See application file for complete search history.

(56) References Cited

U.S. PATENT DOCUMENTS

| | | | | |
|---|---|---|---|---|
| 650,860 | A * | 6/1900 | McTighe | F16G 11/02 24/115 A |
| 895,065 | A * | 8/1908 | Boulter | F16G 11/00 403/209 |
| 1,643,150 | A * | 9/1927 | Conner | F16G 11/02 24/114.5 |
| 3,475,795 | A * | 11/1969 | Youngblood | F16G 11/05 174/135 |
| 3,844,601 | A * | 10/1974 | Rochester, Jr. | B66C 1/12 24/114.5 |
| 4,055,365 | A * | 10/1977 | Kucherry | F16G 11/14 24/115 R |

* cited by examiner

*Primary Examiner* — Stephen A Vu

(57) ABSTRACT

A choker cable having its end portions encapsulated by ferrules, wherein the cable wire ends extend at least to the distal ends of the ferrule sleeves, and wherein the wire ends are all fused into a mushroom shaped cap structure and wherein peripheral portions of the cap structure overlie the distal ends of the ferrule sleeves.

6 Claims, 4 Drawing Sheets

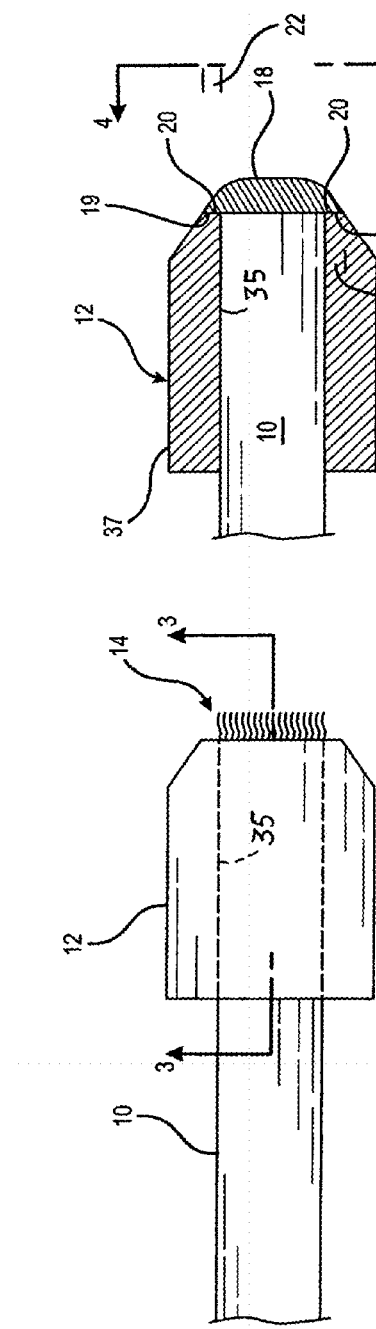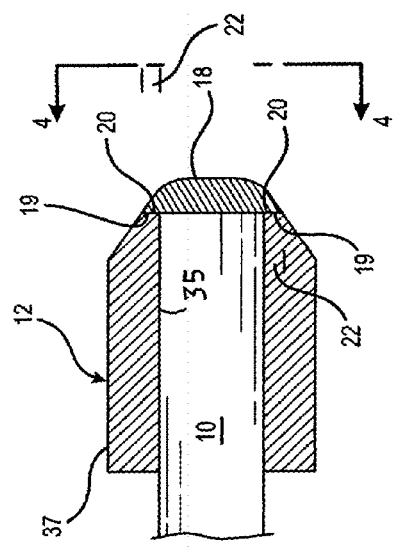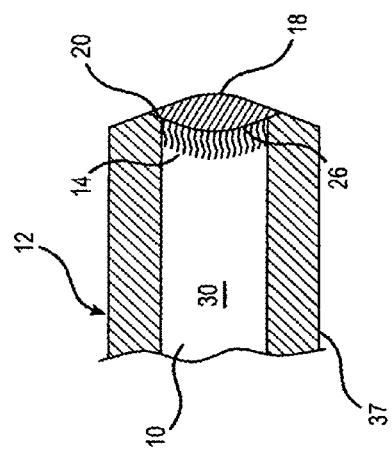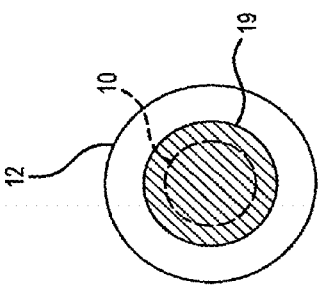

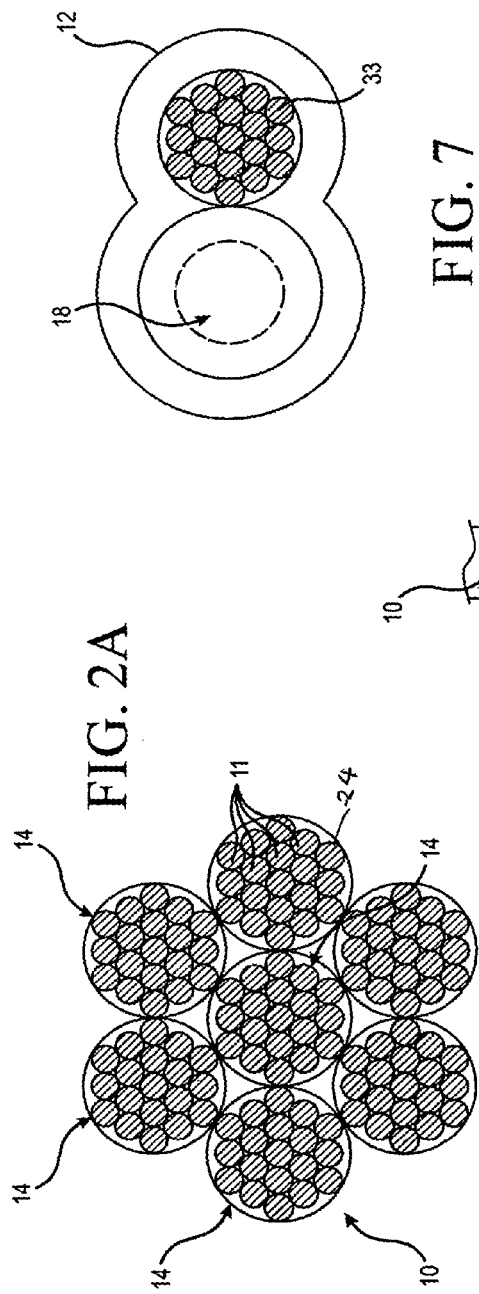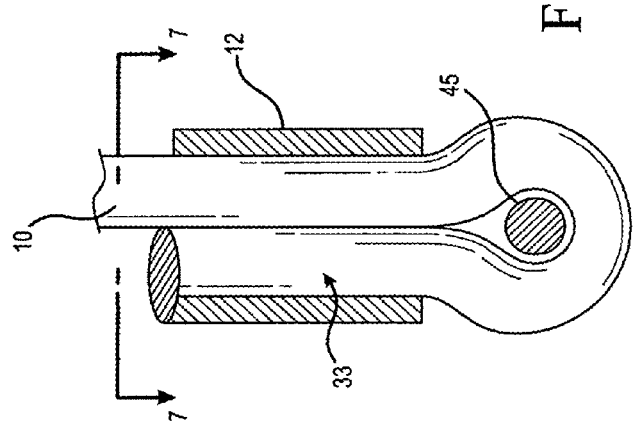

ized with the final form of the connection cap 18 formed by the fusion of the cable wire ends 14 is shown in FIGS. 1, 3-6 and 7.

WIRE ROPE LOGGING CHOKER

This application is a Complete Application for and claims the benefit of Applicant's Provisional 62/285,132 filed Oct. 19, 2015 and titled "Wire Rope Logging Choker".

FIELD

This invention concerns a wire cable (also termed choker rope) log gripping choker construction having markedly enhanced resistance to dislocation of the cable end ferrule from the cable end.

PRIOR ART

Heretofore, these ferrules have been affixed to the choker cable (rope) ends by any of a wide variety of mechanical means, such as wedging, swaging, crimping, or the like of the ferrule onto the cable and are intended to provide a mechanical stop on the choker cable for engaging the body of a quick disconnect choker hook which is slidably mounted on the choker cable. The general structures of choker ropes (cables) including typical choker hooks, and ferrules, and their functions are shown in detail, and as examples herein of prior logging chokers, in U.S. Pat. Nos. 4,055,365; 4,844,601; 3,239,900; 3,475,795; and 3,175,264, the disclosures of which are hereby incorporated herein by reference in their entireties. However, with these constructions, the most common failure of the logging choker is for the ferrule on the cable end to pull off from the cable (rope) and drop the log, often with devastating results.

The present invention provides both a method and structure for markedly improving the strength of the connection of the ferrule to the cable. Presently, the cable wire ends which stick out of the ferrule sleeve end a short distance is standard for the industry as shown in the U.S. Pat. No. 3,844,601.

SUMMARY OF THE INVENTION

In one preferred embodiment of the present invention, all of the choker cable wire ends which protrude from the distal end of the ferrule (sleeve) are incorporated monolithically by means of their fusion into peripheral portions of a connection cap structure and bear against the distal end of the ferrule sleeve, which structure renders sliding off of the ferrule from the cable a near impossibility.

In a preferred embodiment of the present invention, the cable wire end portions are heated to their softening point and are hammered (forged) into a mounded configuration, i.e., a mushroomed shape, and which fuses them against the outer end of the ferrule. In a further embodiment, the connection cap structure is formed by the cable wire end portions being fused into the cap structure by any type of welding operation and welding apparatus by welding or brazing. It is noted that the fusion operation will result in fusing all of the wire ends into the cap structure whereby sliding of the radially outer wires of the cable end portion within the ferrule sleeve bore 35 is rendered impossible. Such sliding of the outer wires within the sleeve bore is that which occurs when a mechanically connected ferrule is pulled off from the cable.

Enclosed are copies of pull test certificates comparing standard chokers with the present mushroomed chokers. A ferrule pulled off the standard choker cable at 23,020 lbs., while the present mushroomed ferrule choker broke the cable at 31,400 lbs. with both the slider hook ferrule and the winchline ferrule still intact. This results in a 36% stronger choker.

BRIEF DESCRIPTION OF THE DRAWINGS

The present invention will be further understood from the drawings herein wherein the figures are not drawn to scale or in consistent proportions and are intended to illustrate basic structure of the present invention, wherein:

FIG. 2 is a cross-sectional view of the hook end of the cable of FIG. 1 prior to the fusion operation according to the present direction;

FIG. 2A is a lateral cross-section of a typical choker cable;

FIG. 3 is a cross-sectional view of the hook end of the choker cable taken along line 3-3 in FIG. 2 showing the present connection cap in the form of mushroomed cable strand ends which abutted the annular, distal end of the ferrule sleeve;

FIG. 4 is an end view taken along line 4-4 in FIG. 3 and showing the radially and longitudinally bent cable wire ends being fused together and forming the connection cap overlying radially the distal end of the ferrule sleeve;

FIG. 5 is a view as in FIG. 3 showing the welded monolithic form of the connection cap with adjacent distal portions of the ferrule sleeve end being fused into the connection cap along a fusion boundary;

FIG. 6 is a cross-sectional view of the winch line end of the choker cable formed into an eye splice through which a winch cable link 45 is captured;

FIG. 7 is a view taken along line 7-7 in FIG. 6;

DETAILED DESCRIPTION OF THE DRAWINGS

Figure 1:
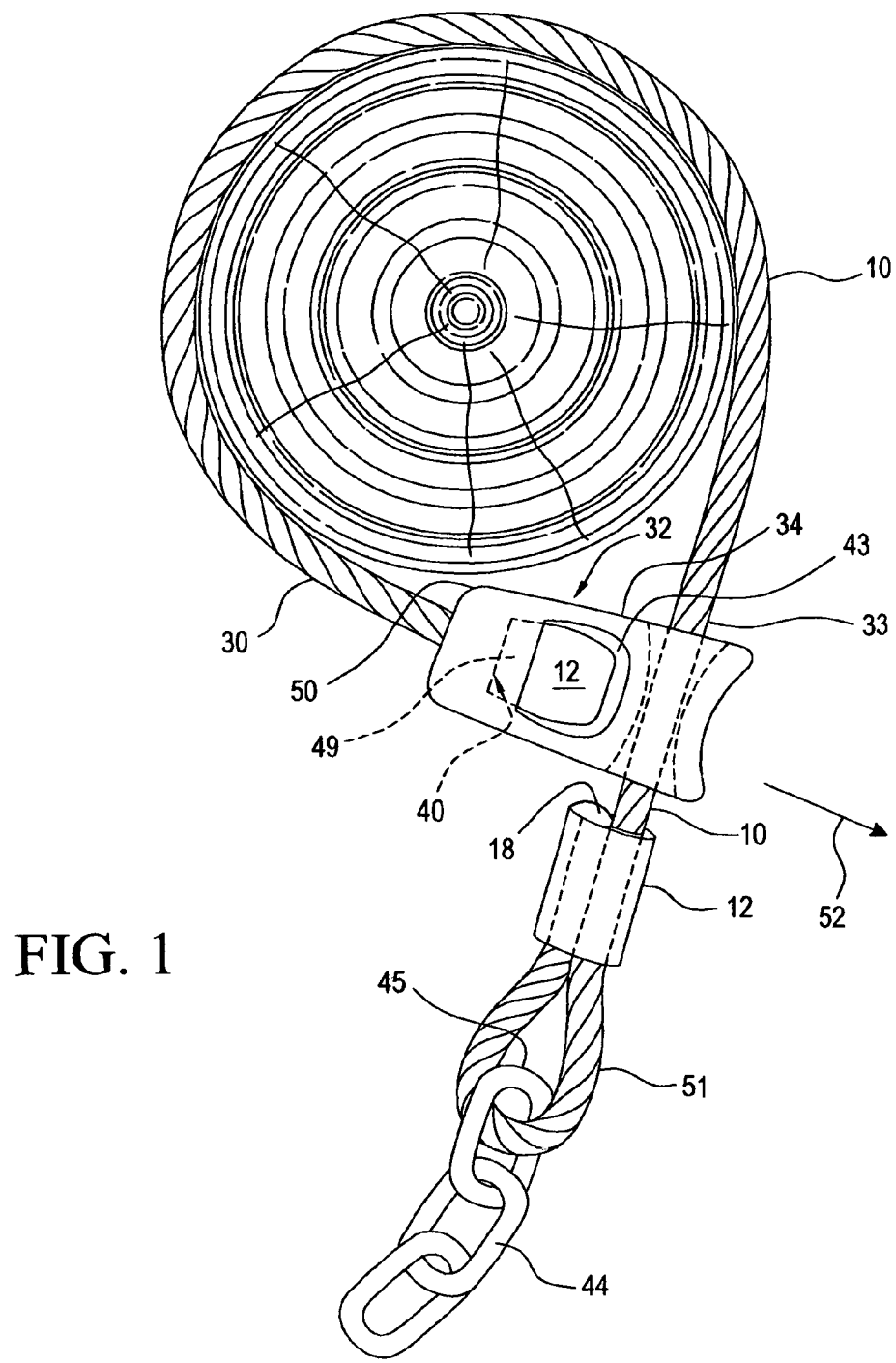
FIG. 1 shows a present steel wire choker cable (rope) wrapped around a log and having a ferrule fixed on each cable wire end portion of the cable by means of the present fusion method, and wherein a slider hook front (access side) of the slider body is shown partially in cross-section.

Referring particularly to FIGS. 1-7 of the drawings and with reference to the claims herein, the present choker cable 10 and ferrule sleeve 12 having a cable bore 35 and a preferably cylindrical wall 37 are as shown, wherein the distal sleeve cable wire 11 (strand) ends 14 prior to formation of the connection cap structure 18 extend longitudinally 52 outwardly of the distal end 20 of ferrule sleeve 12 preferably a distance of from about ⅛ to about ½ in. such that, depending on the width 22 of distal annular end 20 of ferrule sleeve 12, a substantial portion of the strand ends will overlie annular distal end 20 and be forcibly and permanently bent down against 20 by the mushrooming hammer forging forces applied against the heat softened strand ends 14. It is noted that the heat softened ends will become at least partially fused with adjoining (contiguous) wire ends due to the hammering (forging) forces applied thereto during the mushrooming operation and will result in a substantially solid, monolithic connection cap structure 18. Peripheral portions 19 of the cap will overlie distal end 20 of the ferrule sleeve and prevent the ferrule from sliding off the cable end. Cable 10 typically, e.g., as shown in FIG. 2A, comprises helically wound strands 24 of multiple steel wires 11 having a slider hook 32 slidably mounted on the cable between a hook end portion 30 and a winchline end portion 33 of the cable 10.

As shown in FIG. 5, the steel welded cap 18 will create a fusion boundary such as 26 which will incorporate into the fused connector cap 18 the distal ends 14 of all wires 11, the distal end portions 20 of ferrule sleeve 12, and, e.g., a welding rod whereby the ferrule cannot slide off from the cable.

Figure 8:
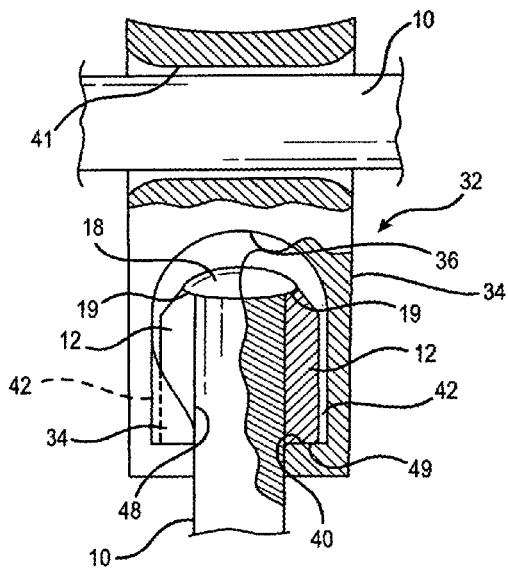
FIG. 8 is a front view of the ferrule and cable access side of the slider hook with the slider hook body partially in cross-section, and with the ferrule and cable end portion nested within said body.
Figure 9:
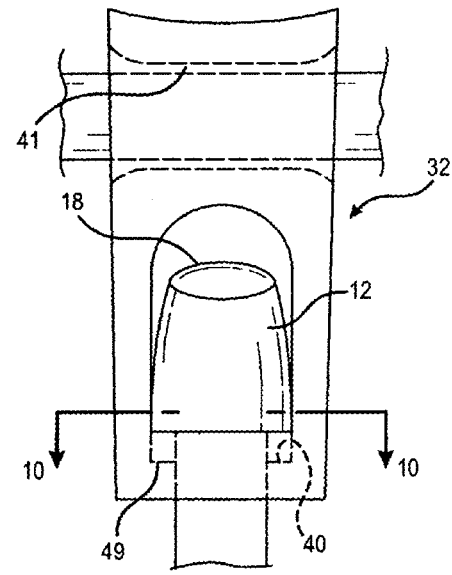
FIG. 9 is a rear view of the slider hook body of FIG. 8.
Figure 10:
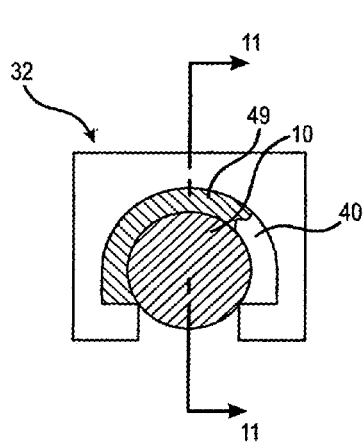
FIG. 10 is a lateral cross-sectional view taken along line 10-10 in FIG. 9 with the cable end in place in the slider hook body.
Figure 11:
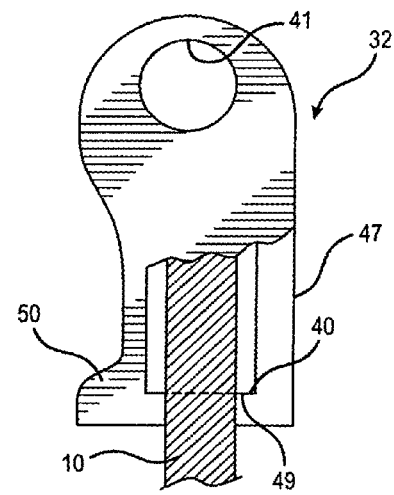
FIG. 11 is a partially cross-sectional longitudinal view of the slider hook body taken along line 11-11 in FIG. 10.

Referring to FIGS. 8-11, the slider hook 32 comprises body 34 having a choker cable bore 41 and further having at said body access (front) side 47, a keyway shaped aperture 43 providing a ferrule access port 36 and a cable access slot 48. This slot is formed at its bottom portion as a short longitudinal ferrule socket 42 having rear wall portion 50 and a semi-annular shelf or cradle 40 on which the bottom or proximal end 49 of the ferrule abuts and prevents the ferrule from being dislocated from the slider hook as long as there is tension on the winchline 44 which is secured to eye splice 51 by chain link 45.

The invention has been described in detail with particular reference to preferred embodiments thereof, but it will be understood that variations and modifications will be effected within the spirit and scope of the invention.

The invention claimed is:

1. A choker cable comprising an elongated bundle of helically wound steel wires,
   said bundle having a hook end portion with a longitudinal axis, and a winchline end portion with a longitudinal axis, the wires of said hook end portion having terminal ends,
   a steel ferrule sleeve having a body portion formed with a cylindrical wall forming a cable bore extending longitudinally therethrough,
   said cylindrical wall having a proximal end and a distal end,
   the wires of said hook end portion of said bundle being mounted through said bore from said proximal end to said distal end of said cylindrical wall with said terminal ends of said wires and said distal end of said cylindrical wall of said ferrule sleeve being positioned substantially in a common lateral plane relative to said longitudinal axis,
   said body portion of said ferrule sleeve being mechanically affixed to said hook end portion of said bundle,
   said distal end of said cylindrical wall of said ferrule sleeve being chemically connected by a solid steel cap to said terminal ends of all said wires in said hook end portion of said bundle,
   wherein said steel cap comprises an intermixture of molecules and atoms of said terminal ends of said wires with molecules and atoms of said distal end of said cylindrical wall of said ferrule sleeve,
   and wherein said steel cap lies substantially laterally over said terminal ends of said wires and substantially laterally over said distal end of said ferrule sleeve.

2. The logging choker of claim 1 wherein said cap structure comprises an added metallic material which has been chemically intermixed with said distal end of said cylindrical wall of said ferrule sleeve and with said distal end of each said wire to form a monolithic solid connection cap structure which chemically joins said ferrule with all wires of said cable.

3. The logging choker of claim 2 wherein said added metallic material is welding steel.

4. The logging choker of claim 2 wherein said added metallic material is brazing composition.

5. The logging choker of claim 1 wherein said distal end of said ferrule sleeve and said peripheral portions of said cap structure have been intermixed molecularly and atomically to a longitudinal depth of from about 1/64 in. to about 1/4 in. longitudinally down into said distal end of said cylindrical wall of said ferrule sleeve.

6. A choker cable comprising an elongated bundle of helically wound steel wires,
   said bundle having a hook end portion with a longitudinal axis, and a winchline end portion with a longitudinal axis,
   wherein the wires of each said end portion have terminal ends, each said end portion further comprising,
   a steel ferrule sleeve having a body portion formed with a cylindrical wall forming a cable bore extending longitudinally therethrough,
   wherein said cylindrical wall has a proximal end and a distal end,
   wherein the wires of said end portion are mounted through said bore from said proximal end to said distal end of said cylindrical wall with said terminal ends of said wires and said distal end of said cylindrical wall being positioned substantially in a common lateral plane relative to said longitudinal axis,
   wherein said body portion of said ferrule sleeve is mechanically affixed to said end portion,
   wherein said distal end of said cylindrical wall is chemically connected by a solid steel cap to said terminal ends of said wires,
   wherein said steel cap comprises an intermixture of molecules and atoms of said terminal ends of said wires with molecules and atoms of said distal end of said cylindrical wall of said ferrule sleeve, and
   wherein each said steel cap lies substantially laterally over said terminal ends of said wires and substantially laterally over said distal end of said ferrule sleeve.

* * * * *